United States Patent [19]

Webre, Jr. et al.

[11] 4,199,298
[45] Apr. 22, 1980

[54] TRAILER FOR SKID MOUNTED TANKS

[75] Inventors: Rodney F. A. Webre, Jr.; Oris H. Dinger, Jr., both of Houma, La.

[73] Assignee: TBW Industries, Inc., Houma, La.

[21] Appl. No.: 857,272

[22] Filed: Dec. 5, 1977

[51] Int. Cl.² .................................................. B60P 3/40
[52] U.S. Cl. .................................. 414/458; 280/43.23; 280/404
[58] Field of Search .............................. 214/390, 512; 280/43.12, 43.11, 43.19, 43.23, 404; 105/367; 292/256.75; 24/249 LS, 132 WL

[56] References Cited

U.S. PATENT DOCUMENTS

| 2,350,841 | 6/1944 | Troche et al. | 280/43.11 X |
| 3,339,766 | 9/1967 | Fulmer et al. | 280/43.23 X |
| 3,392,857 | 7/1968 | Tantlinger | 214/390 |
| 3,631,999 | 1/1972 | Walerowski | 214/390 |

FOREIGN PATENT DOCUMENTS

| 213894 | 11/1960 | Austria | 280/404 |
| 162068 | 6/1933 | Fed. Rep. of Germany | 24/249 LS |

*Primary Examiner*—Robert G. Sheridan
*Assistant Examiner*—Terrance L. Siemens
*Attorney, Agent, or Firm*—Ranseler O. Wyatt

[57] ABSTRACT

A trailer for skid mounted tanks having a pair of sections, connectors on each section for connection on to the respective ends of the skids of a skid mounted tank, each section having cables and hydraulic cylinders for raising said skids into connection position with the respective sections, and adjustable stabilizing supports for securing the tank during transportation, the forward section having a gooseneck structure and a king pin for connection to the fifth wheel of a tractor.

1 Claim, 7 Drawing Figures

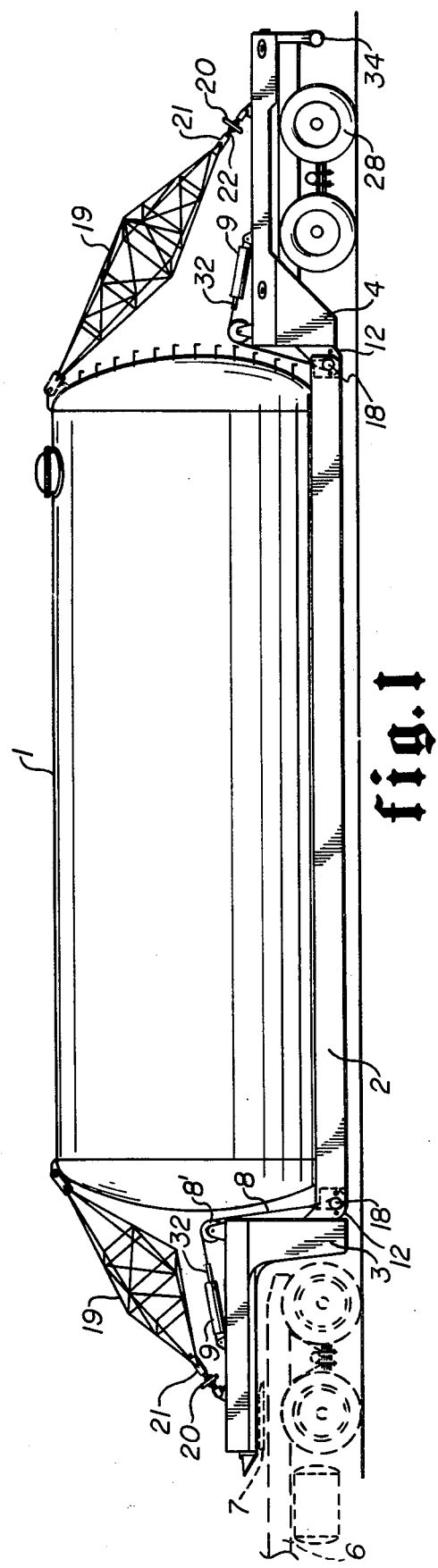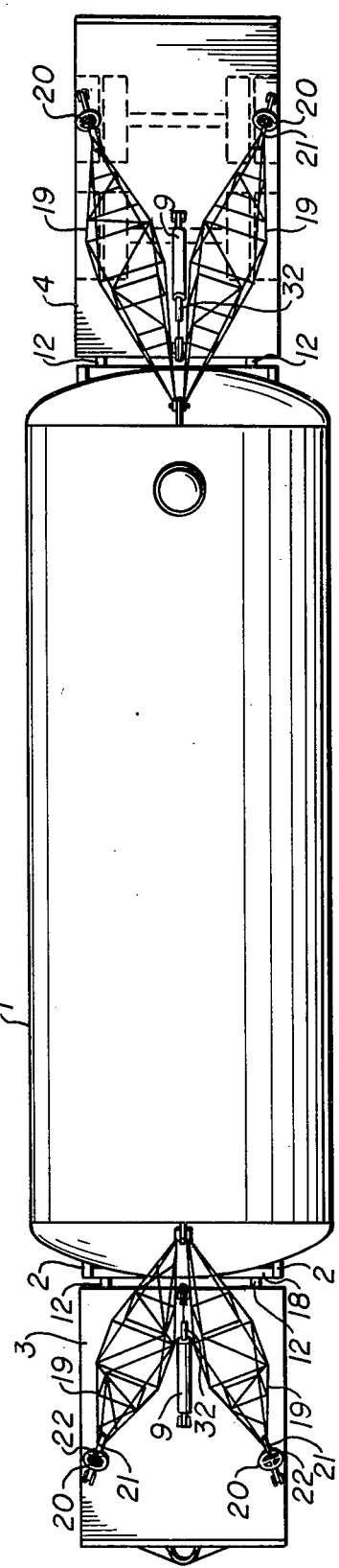

TRAILER FOR SKID MOUNTED TANKS

BACKGROUND OF THE INVENTION

Portable tanks have been an absolute necessity, particularly in the oil field industry, for many years. To mount tanks on skids is customary, but to load and unload these tanks for movement of same from one location to another has always been a burdensome task, requiring a flat bed truck and winching equipment, requiring many hours of work and often causing damage to the tank. It is an object of this invention to provide means for ready transportation of heavy tanks with a minimum of labor, a minimum of equipment and a maximum of safety.

SUMMARY OF THE INVENTION

A trailer for moving skid mounted tanks divided into two sections, each section having means for connection with the respective ends of the skid members and each section having means for raising one end of the trailer into the connection means at the required level for travel, and each section having adjustable stabilizing equipment for maintaining the tanks in position on the trailer as it is transportated.

BRIEF DESCRIPTION OF THE DRAWINGS

FIG. 1 is a side elevational view of a tank mounted on the trailer, showing a portion of a tractor in dotted lines.

FIG. 2 is a top plan view of the trailer with a tank mounted thereon.

DESCRIPTION OF THE PREFERRED EMBODIMENT

Figure 3:
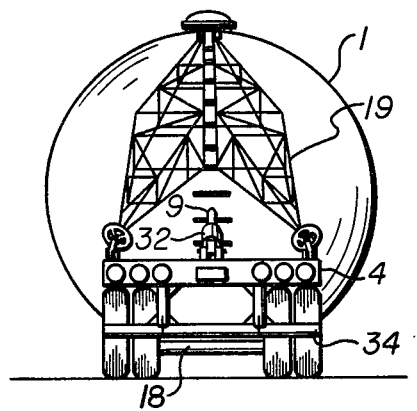
FIG. 3 is a rear elevational view of the trailer mounted tank in traveling position.
Figure 4:
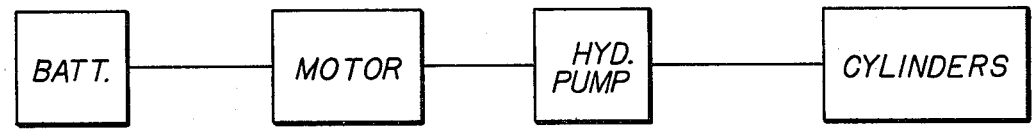
FIG. 4 is a diagram of the power system train employed to activate the hydraulic cylinders.

In the drawings, the numeral 1 designates a tank mounted on a pair of skids 2, 2. The trailer is divided into two sections, 3, 4, the front section 3 having a gooseneck connection with the usual king pin (not shown) to mount on the usual fifth wheel 7 of a tractor 6, in the usual manner. A cable as 8 is mounted on each section 3, 4 and is actuated by a hydraulic cylinder as 9 from which a ram arm 32 extends. The extended end of the ram arm 10 is secured to one end of the cable 8, and the cable 8 rides on the sheave 8' and is adapted to be looped around the bar 18 which extends transversely across one end of the skids 2, 2. Rigid connection members, as 12, extend from one end of each section 3, 4, and the extended end of the member 12 forms the upper half of a C clamp 13, providing a saddle, so that when the bar 18 extending across the end of the tank skids, and joining same, is raised and seated in said saddle, the lower half 15 of said C-clamp, which is pivotally mounted on said rigid member 12, may be pivoted upwardly and in engagement with said upper half 13 by means of the bolt 16, which extends upwardly through the cross plate 17, and the nut 30 is received by said bolt 16 to firmly lock the clamp against the bar 18.

The tank 1, provided with the skids 2, 2 having the horizontal cross bar supports 18, 18 at each end, is maintained in position on the trailer by means of the rigid adjustable support members 19, 19, which are positioned on the sections abutting the tank ends, one end of which may be connected to the upper surface of the tank, and the other end being adjustably mounted on one of the sections to prevent the tank from contacting the respective sections while the trailer is in motion. Manually operated wheels 20, 20 are mounted on the threaded shafts forming one end of the support members 19, and are adapted to rotate the threaded shafts in the sockets 21, the shafts 22 being thus moved to adjust the position of the rigid members 19, maintaining the spaced relation between the sections and the tank.

Figure 5:
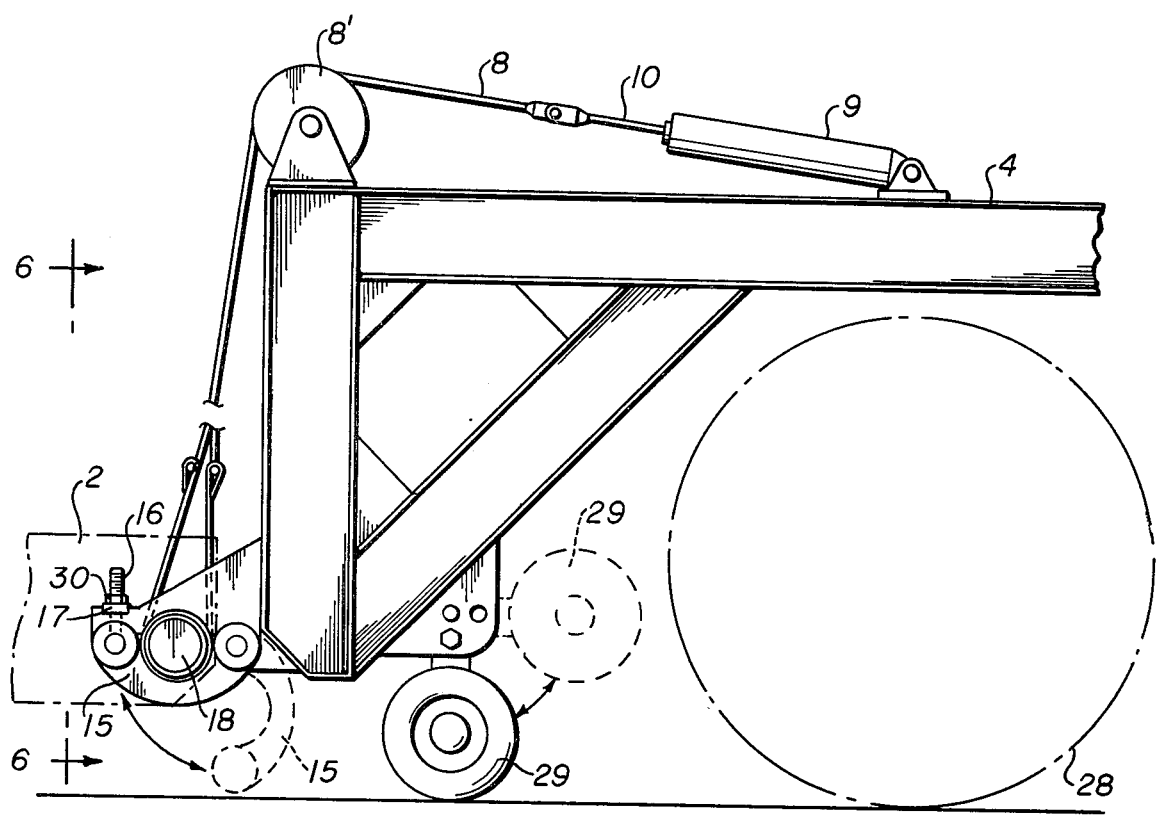
FIG. 5 is a side elevational view of the rear section of a trailer showing the means of connecting the respective trailer sections to the tank skid supports.
Figure 7:
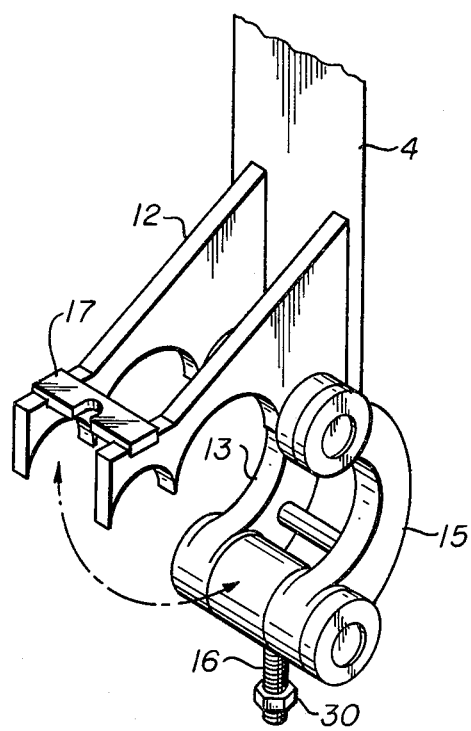
FIG. 7 is an elevational perspective view of the section connecting means in disconnected position.
Figure 6:
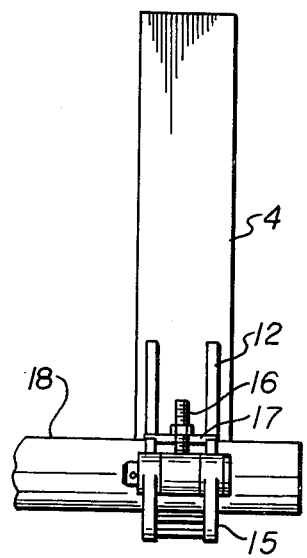
FIG. 6 is a fragmentary front elevational view of the rear section, taken on the line 6—6 of FIG. 5, showing the connecting means connected to the trailer.

The rear section of the trailer is provided with tandem wheels 28, and the rigid connecting member 12, hydraulic cylinders as 9 and rams as 32, connected to cables, as 8, which may be secured to the bar 18 and the bar thus lifted into the saddle 13 formed by the upper portion of the C-clamp on said extended member 12, and locked in place by the pivotal lower portion of said clamp 15, as above described. A retractable wheel 29 is mounted adjacent one end of the rear section, opposite the wheels 28, and while awaiting connection of the section to a tank, and while connecting said section to a tank, said wheel 29 maintains the section 4 in position, particularly against the tendency of the section to tilt on the wheels 28 when a load is placed on the cable 8. When the tank is connected to the section, the wheel 29 may be retracted by suitable means to the position shown in dotted lines in FIG. 5.

The trailer is portable, when it is not carrying a load, by connecting the front and rear sections 3, 4 together, moving the connecting members of the front section into engagement with the horizontal bumper 34 of the rear section and raising the retractable wheel 29. The king pin in the gooseneck of the front section may then be mounted in the fifth wheel of a tractor, and the trailer moved as desired.

To move a skid mounted tank, as herein described, the king pin in the gooseneck of the front section is moved into connection with the fifth wheel of a tractor and the free end of the cable 8 is secured to the horizontal bar 18 extending across the front end of the tank skids 2, 2 and the bar 18 lifted into the saddle 13 and the lower portion of the clamp pivoted into connection with the upper half of the clamp and secured in place by the nut 30 against the bar 18 of the front end of the skids 2, 2. To lift the bar 18, the cable 8 rides on the sheave 8' and the sheave 8' is mounted on the section framework so as to extend upwardly therefrom, at one end, so that as the ram is retracted, the cable will pull the bar 18 in a path that will direct it into the saddle 13. Upon securing the bar 18 in the saddle 13, the process is repeated with the rear section, the retractable wheel 29 furnishing the necessary support for the lift, and when the bar at the rear end of the skids is locked in place, the retractable wheel 29 is retracted and the tank moved to the location desired.

When the tank reaches its desired destination, the process is reversed, and the sections disconnected from the tank, and then connected to each other for transportation or storage.

What we claim is:

1. In a tank trailer, a pair of trailer sections, said sections being adapted to be positioned at the respective ends of a skid mounted tank, connecting means for securing one end of one of said sections to the forward end of said tank and one end of the other section to the rearward end of said tank, means for raising each end of said tank into said connecting means and anchoring said tank and skids in traveling position, said means for raising said tank into connected position consists of fixed members extending from one end of each of said sections, hydraulic cylinders having reciprocating rams mounted on each of said sections, cables extending from said rams to said connecting members, a sheave on one end of each of said sections over which said cable travels horizontal bars connecting the extended ends of said skids and bar receiving means, one portion of which is pivotally mounted on said connecting member and means for selectively locking said bars in raised position.

* * * * *